(12) United States Patent
Rogers

(10) Patent No.: US 10,405,519 B2
(45) Date of Patent: Sep. 10, 2019

(54) APPARATUS TO DISCOURAGE A CANINE OR OTHER ANIMAL FROM RUNNING

(71) Applicant: Thomas D. Rogers, Floral City, FL (US)

(72) Inventor: Thomas D. Rogers, Floral City, FL (US)

( * ) Notice: Subject to any disclaimer, the term of this patent is extended or adjusted under 35 U.S.C. 154(b) by 364 days.

(21) Appl. No.: 15/307,816

(22) PCT Filed: Apr. 30, 2015

(86) PCT No.: PCT/US2015/028499
§ 371 (c)(1),
(2) Date: Oct. 29, 2016

(87) PCT Pub. No.: WO2015/168396
PCT Pub. Date: Nov. 5, 2015

(65) Prior Publication Data
US 2017/0064925 A1    Mar. 9, 2017

Related U.S. Application Data

(60) Provisional application No. 61/986,318, filed on Apr. 30, 2014.

(51) Int. Cl.
*A01K 15/02* (2006.01)
*A01K 27/00* (2006.01)

(52) U.S. Cl.
CPC ............ *A01K 15/02* (2013.01); *A01K 27/001* (2013.01)

(58) Field of Classification Search
CPC ..................... A01K 15/02; A01K 27/001–004
See application file for complete search history.

(56) References Cited

U.S. PATENT DOCUMENTS

| 283,240 | A | | 8/1883 | Heaton | |
|---|---|---|---|---|---|
| 2,172,043 | A | * | 9/1939 | Wolf | G01B 3/1005 242/379 |
| D124,073 | S | * | 12/1940 | Gottlieb | D30/153 |
| 2,776,644 | A | * | 1/1957 | Fontaine | A01K 27/004 119/796 |

(Continued)

FOREIGN PATENT DOCUMENTS

WO    2005094943    10/2005

OTHER PUBLICATIONS

Btoaguirre, "Chaco Salteño, De Pesonajes, Animales Y Lugares", Oct. 26, 2014, pp. 9 and 10, viewed at: http://www.foro.fullaventura.com/viewtopic.php?t=126247#p2168722 on May 2, 2017 (photographs are admitted prior art).

(Continued)

*Primary Examiner* — Magdalena Topoloski
*Assistant Examiner* — Morgan T Barlow
(74) *Attorney, Agent, or Firm* — Law Office of Steven R. Olsen, PLLC; Steven R. Olsen

(57) ABSTRACT

The training and control apparatus preferably includes a pendant that is coupled to a spring loaded retractable reel via a tether. The apparatus can be fitted to a canine or other animal via a collar. When the canine or other animal begins to run, the pendant is automatically deployed away from the spring loaded retractable reel, interfering with legs of the canine or other animal and discouraging running. In embodiments of the invention, the pendant includes ornamental features.

13 Claims, 5 Drawing Sheets

(56) References Cited

U.S. PATENT DOCUMENTS

| | | | |
|---|---|---|---|
| 2,790,418 A | 4/1957 | Boling | |
| 3,088,438 A * | 5/1963 | Oliphant | A01K 27/004 |
| | | | 119/770 |
| 3,123,052 A * | 3/1964 | Marshall | A01K 1/04 |
| | | | 119/789 |
| 3,315,642 A * | 4/1967 | Rogers | A01K 27/004 |
| | | | 119/796 |
| D243,411 S | 2/1977 | Johnson | |
| 4,159,809 A * | 7/1979 | Rawson | B60R 22/34 |
| | | | 185/45 |
| 4,165,713 A * | 8/1979 | Brawner | A01K 27/004 |
| | | | 119/794 |
| 4,328,766 A * | 5/1982 | Deibert | A01K 27/004 |
| | | | 119/794 |
| 4,328,767 A * | 5/1982 | Peterson | A01K 27/004 |
| | | | 119/794 |
| 4,964,370 A | 10/1990 | Peterson | |
| 4,997,860 A | 3/1991 | Kabeta | |
| 5,733,231 A * | 3/1998 | Corn | A63B 21/025 |
| | | | 482/120 |
| 5,816,198 A | 10/1998 | Peterson | |
| 6,205,956 B1 * | 3/2001 | Dickie | A01K 27/005 |
| | | | 119/776 |
| 7,617,800 B2 | 11/2009 | Trescott | |
| 7,896,281 B2 * | 3/2011 | Bleshoy | A01K 27/004 |
| | | | 119/796 |
| 8,151,738 B1 | 4/2012 | Farris | |
| 8,336,504 B1 * | 12/2012 | Geis | A01K 27/004 |
| | | | 119/794 |
| 8,347,824 B2 * | 1/2013 | Marshall | A01K 27/005 |
| | | | 119/794 |
| 8,978,593 B2 * | 3/2015 | Catena | A01K 27/004 |
| | | | 119/794 |
| 9,193,561 B2 * | 11/2015 | Yan | B65H 75/406 |
| 2005/0103283 A1 | 5/2005 | Penzak | |
| 2006/0144344 A1 | 7/2006 | Stokes et al. | |
| 2008/0141950 A1 * | 6/2008 | Glazer | A01K 27/004 |
| | | | 119/770 |
| 2008/0282994 A1 * | 11/2008 | Martin | A01K 15/02 |
| | | | 119/795 |
| 2011/0073047 A1 * | 3/2011 | Simpson | A01K 1/04 |
| | | | 119/796 |
| 2011/0232584 A1 * | 9/2011 | Valencia | A01K 15/02 |
| | | | 119/719 |
| 2012/0279461 A1 | 11/2012 | Levell | |
| 2013/0125832 A1 * | 5/2013 | Tang | A01K 27/004 |
| | | | 119/794 |
| 2013/0284114 A1 * | 10/2013 | Bizzell | A01K 27/004 |
| | | | 119/796 |
| 2014/0263799 A1 * | 9/2014 | Baerwald | A01K 27/004 |
| | | | 242/381.5 |
| 2016/0219838 A1 * | 8/2016 | Flaig | A01K 27/008 |
| 2016/0249589 A1 * | 9/2016 | Soto | A01K 27/005 |
| | | | 119/794 |
| 2016/0270373 A1 * | 9/2016 | Bova | A01K 27/005 |
| 2016/0317855 A1 * | 11/2016 | Rolls | A63B 21/0603 |
| 2017/0000088 A1 * | 1/2017 | Smith | A01K 27/004 |
| 2017/0000089 A1 * | 1/2017 | Woods | A01K 27/004 |
| 2017/0347629 A1 * | 12/2017 | Lee | A01K 27/005 |
| 2018/0168128 A1 * | 6/2018 | Leach | A01K 15/04 |
| 2018/0242557 A1 * | 8/2018 | Woods | A01K 27/004 |
| 2018/0303069 A1 * | 10/2018 | Cox | A01K 27/004 |
| 2019/0150403 A1 * | 5/2019 | Zhu | A01K 27/004 |

OTHER PUBLICATIONS

Maremmano, "Dangle Stick", Mar. 31, 2012, pp. 1 and 2, viewed at: http://maremmano-morango.blogspot.com/2012/03/dangle-stick.html on May 2, 2017 (see photographs).

Lovetree, "Re: Dogs Chewing Lambs", Jun. 14, 2009, pp. 1 and 2, viewed at http://www.sheepimprovement.net/sheep_production/viewtopic.php?t=2162 on May 2, 2017 (see description of "dangle stick" on p. 2).

* cited by examiner

APPARATUS TO DISCOURAGE A CANINE OR OTHER ANIMAL FROM RUNNING

This application is a U.S. national stage application of international application no. PCT/US2015/028499 and claims the benefit of U.S. provisional application No. 61/986,318, filed 30 Apr. 2014.

BACKGROUND (1) Field of Invention

The invention relates generally to the field of animal training and control. In particular, but not by way of limitation, the invention relates to an apparatus that can be used to discourage a domesticated canine or other animal from running.

(2) Description of Related Art

The field of animal training is concerned with modifying certain behaviors in an animal. In many instances, it may be undesirable for an animal to run. For example, a domesticated canine (dog) that is running outdoors may quickly distance itself from its human master. Allowing a dog to run indoors may also be undesirable in many circumstances.

Leashes are well known for maintaining physical control over an animal. But leashes have many shortcomings. For instance, using a leash to prevent running requires constant and direct control by a human handler. Moreover, in use, leashes can create an interference hazard to humans and objects in ways that are not always predictable. Shock collars are also known for maintaining physical control over an animal. But, like the leash, shock collar use requires constant human supervision. In addition, shock collars also have a limited geographic range of operation, are not universally effective, and both the remote controller and collar require sufficiently-charged batteries for operation. Moreover, shock collars may cause physical pain and/or emotional stress to the animal. For these and other reasons, an improved way to discourage a dog or other animal from running is needed.

SUMMARY OF THE INVENTION

Embodiments of the invention seek to overcome one or more limitations of the prior art devices described above. To achieve this objective, embodiments of the invention provide a training and control apparatus that does not require full-time human supervision. The training and control apparatus preferably includes a pendant that is coupled to a spring loaded retractable reel via a tether. The apparatus can be fitted to a canine or other animal via a collar. When the canine or other animal begins to run, the pendant is automatically deployed away from the spring loaded retractable reel, interfering with legs of the canine or other animal and discouraging running. In embodiments of the invention, the pendant includes ornamental features. An alternative embodiment includes a remote control feature that can selectively enable or disable the training and control apparatus.

BRIEF DESCRIPTION OF THE DRAWINGS

Embodiments of the invention are described with reference to the following drawings, wherein.

DETAILED DESCRIPTION

Embodiments of the invention will now be described more fully with reference to FIGS. 1-12 where like components are tagged with the same reference designator, and where features are not necessarily drawn to scale. The invention may, however, be embodied in many different forms and should not be construed as limited to the embodiments set forth herein.

Apparatus

Figure 1:
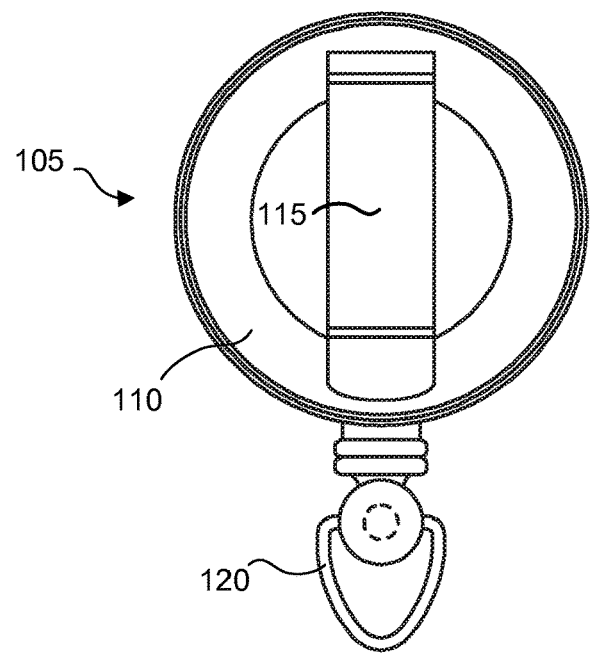
FIG. 1 is an elevation view of a spring loaded retractable reel, according to an embodiment of the invention.
Figure 2:
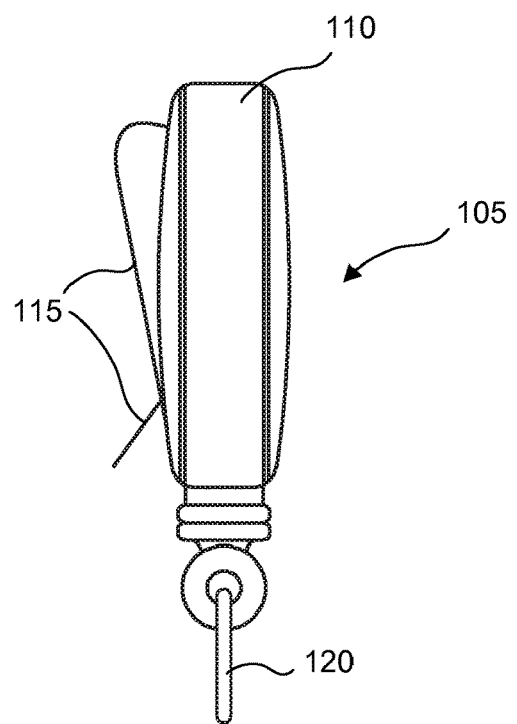
FIG. 2 is a side view of a spring loaded retractable reel, according to an embodiment of the invention.

FIG. 1 is an elevation view of a spring loaded retractable reel, according to an embodiment of the invention. FIG. 2 is a side view of the spring loaded retractable reel illustrated in FIG. 1. As shown therein, a spring loaded retractable reel 105 includes (but is not limited to) a housing 110, clip 115 and ring 120. The clip 115 facilitates the attachment of the spring loaded retractable reel 105 to a collar (for instance a conventional dog collar, not shown). The pull ring 120 facilitates the coupling of a pendant 305, as will be described below with reference to FIGS. 3-7.

Variations to the apparatus illustrated in FIGS. 1 and 2 and described above are possible. For instance the clip 115 could be differently shaped. Moreover, fasteners other than the clip 115 could be used to temporarily or permanently affix a spring loaded retractable reel 105 to a collar. The shape of the pull ring 120 could be varied according to design choice.

Figure 3:
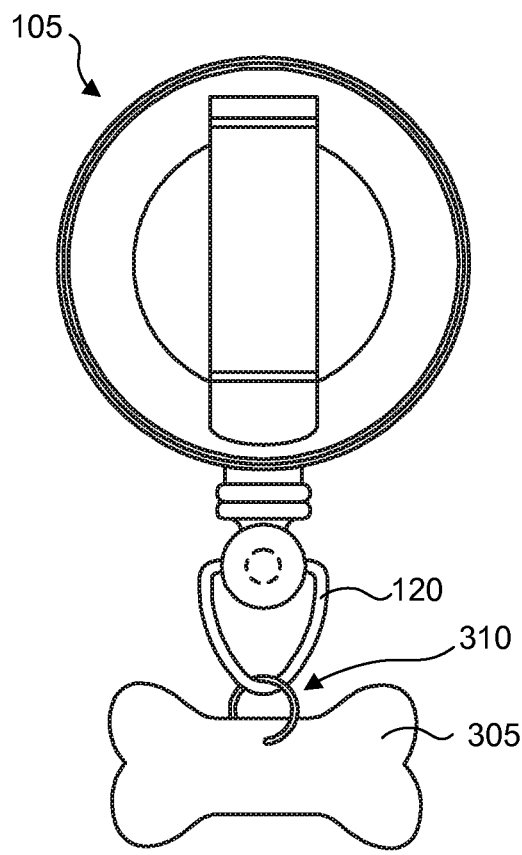
FIG. 3 is an elevation view of a training and control apparatus in a pre-deployment state, according to an embodiment of the invention.

FIG. 3 is an elevation view of a training and control apparatus in a pre-deployment (pendant retracted) state, according to an embodiment of the invention. As illustrated therein, a pendant 305 is connected to the pull ring 120 via a coupling ring 310. Other types of mechanical couplings that do not require the pull ring 120 and/or coupling ring 310 could be used to connect the pendant 305 to a tether 405 (illustrated in FIG. 4) of the spring loaded retractable reel 105.

The pendant 305 could be formed, for example, from thermoplastic, rubber, or other rigid or semi-rigid material.

In one respect, the mass (m) of the pendant 305 is predetermined such that a retraction force ($F_r$) of the spring loaded retractable reel 105 is greater or equal to an opposing force ($-F_p$) caused the gravitational pull (acceleration $a_g$) on the pendant 305. This is the pre-deployment state characterized by no downward extension of the pendant 305, as illustrated in FIG. 3, and can be expressed as follows:

$$F_r \leq -F_p, \text{ where } F_p = m\, a_g$$

Figure 4:
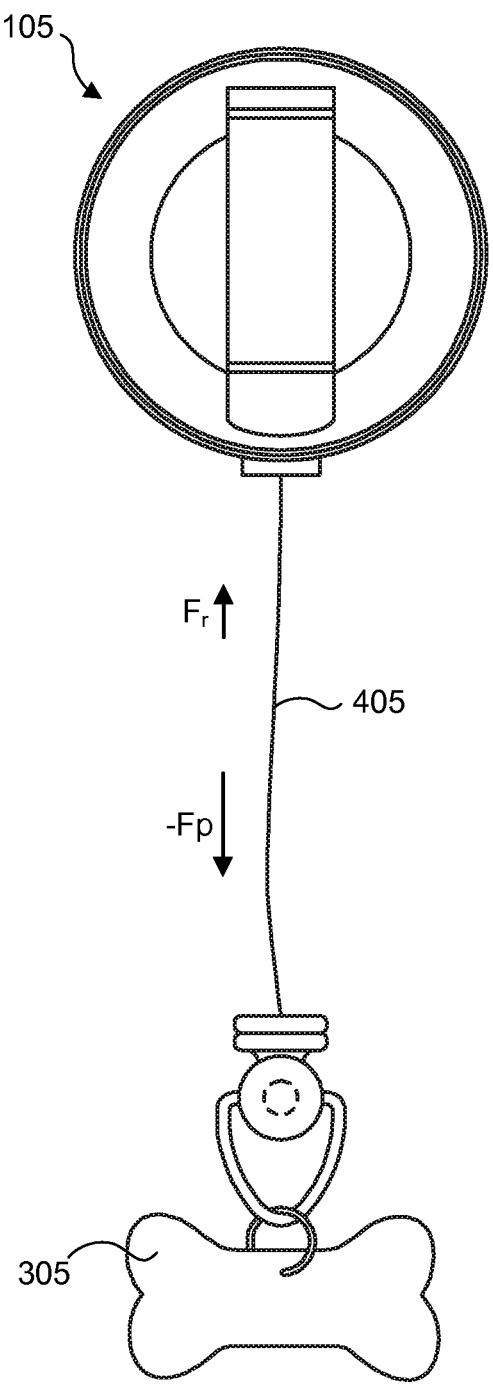
FIG. 4 is an elevation view of a training and control apparatus in a deployed state, according to an embodiment of the invention.

FIG. 4 is an elevation view of a training and control apparatus in a deployed state, according to an embodiment of the invention. FIG. 4 shows the training and control apparatus in a deployed state, the pendant 305 being suspended by a tether 405 that has at least partially unwound from the spring loaded retractable reel 105 due to the addition of sufficient motion-based acceleration ($a_m$) acting on the pendant 305. Accordingly, the mass (m) of the pendant 305 must be great enough so that the retraction force ($F_r$) is overcome (at least temporarily) when a sufficient motion-based acceleration ($a_m$), whether centrifugal or otherwise, is added to the gravitational pull ($a_g$) on the pendant 305:

$$F_r < -F_p, \text{ where } F_p = m(a_g + a_m)$$

Variations to the pendant 305 illustrated in FIGS. 3 and 4 are possible. For example, instead of being styled as a dog bone, the pendant 305 could instead have the shape and/or texture of a basketball, golf ball, heart symbol, or other decorative item. In embodiments of the invention, a housing of the spring loaded retractable reel 105 may also include ornamental features. For instance at least a portion of the housing of the spring loaded retractable reel 105 could include a stylized baseball mitt to cooperate with a pendant 305 that is styled as a baseball. Similarly, at least a portion of the housing of the spring loaded retractable reel 105 could include a stylized ring setting to cooperate with a pendant 305 that is styled as a gemstone.

Figure 5:
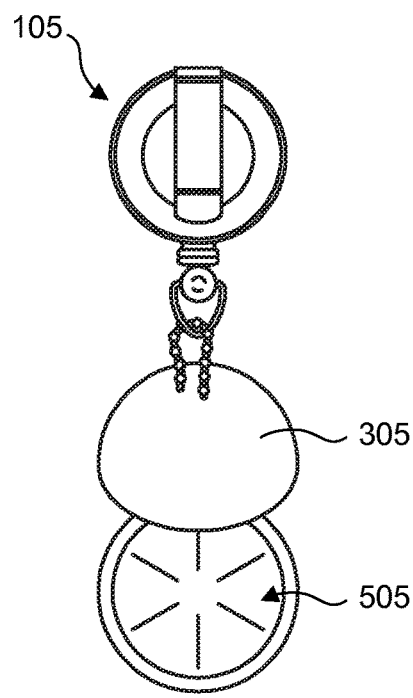
FIG. 5 is an elevation view of a training and control apparatus in a pre-deployment state, according to an embodiment of the invention.
Figure 6:
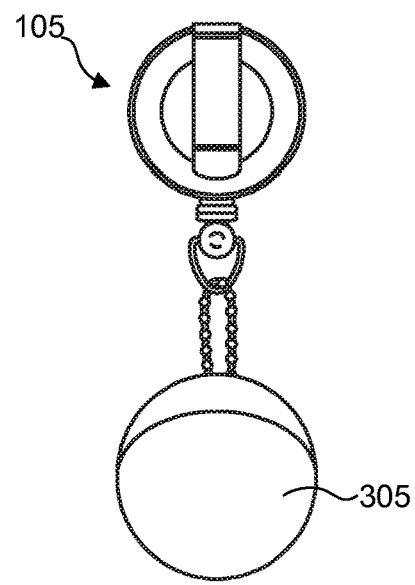
FIG. 6 is an elevation view of a training and control apparatus in a pre-deployment state, according to an embodiment of the invention.
Figure 7:
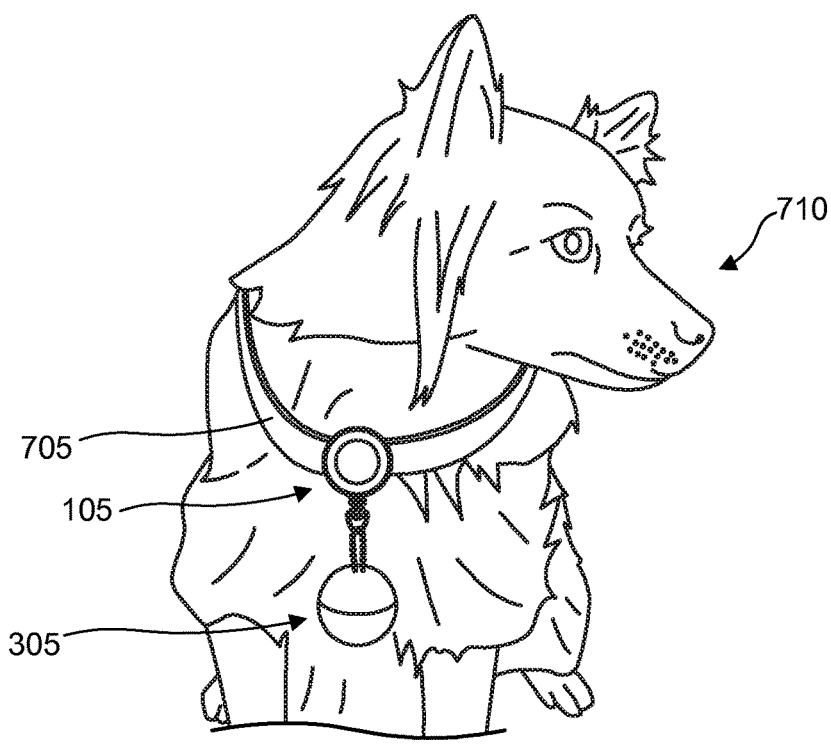
FIG. 7 is an elevation view of a training and control apparatus in a pre-deployment state, according to an embodiment of the invention.

The mass (m) of the pendant 305 need not be uniformly distributed. In an embodiment of the invention, the pendant 305 includes a storage cavity. Such a pendant 305 is illustrated in FIG. 5 (in an opened state to reveal the storage cavity 505) and in FIGS. 6 and 7 (in closed state). One or more weights could be inserted into the storage cavity 505 of the pendant 305 in FIGS. 5-7 to configure the pendant 305 with an appropriate mass (m).

In embodiments of the invention, the training and control apparatus is removably coupled to a collar 705. In alternative embodiments, the training and control apparatus may be permanently affixed to a collar 705 or may be an integral part of a collar 705, according to design choice.

Figure 8:
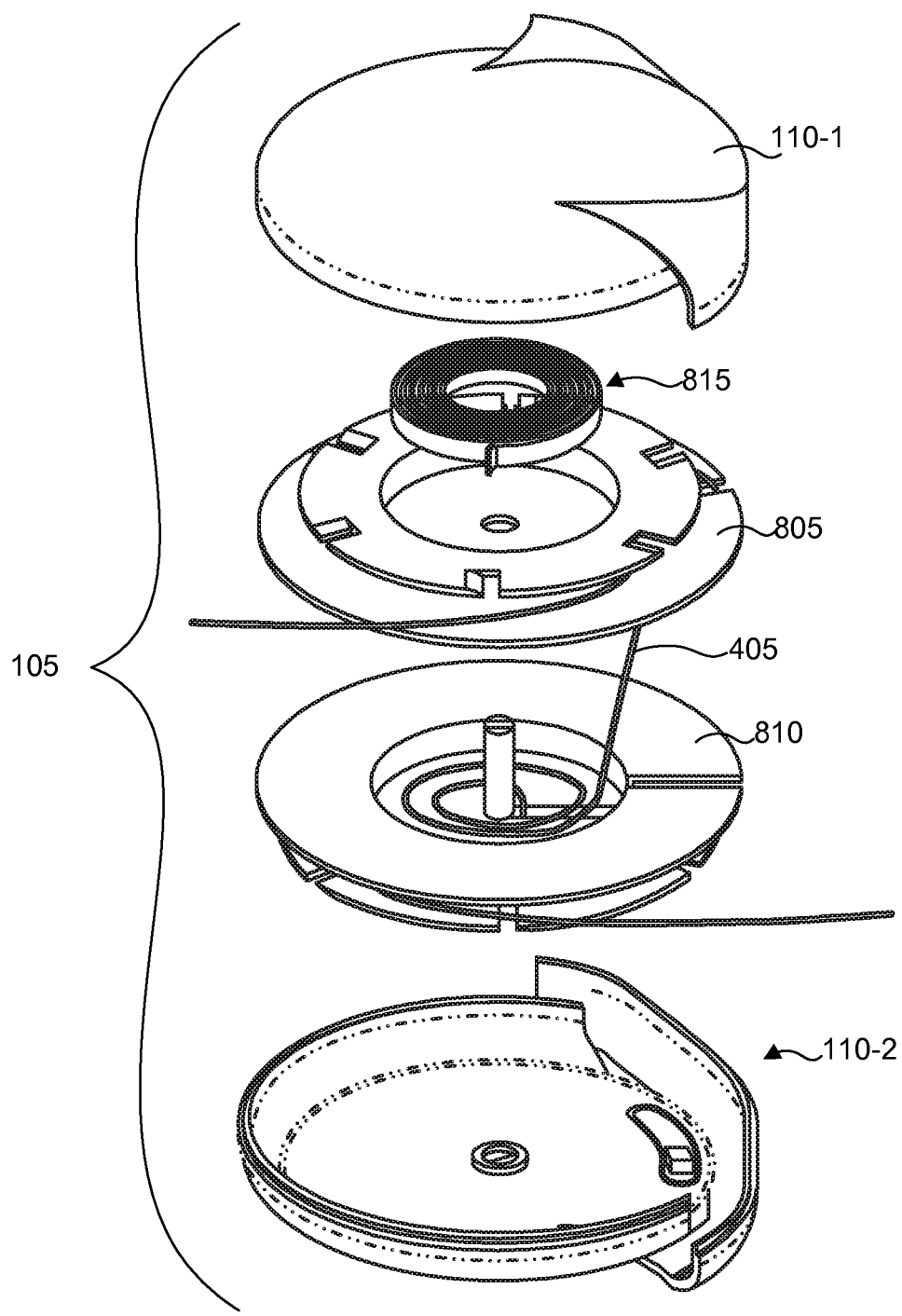
FIG. 8 is an exploded assembly view of a spring loaded retractable reel, according to an embodiment of the invention.

FIG. 8 is an exploded assembly view of a spring loaded retractable reel, according to an embodiment of the invention. As shown therein, a spring loaded retractable reel 105 may include a top housing 110-1, a bottom housing 110-2, an upper reel component 805, a lower reel component 810, and a spiral torsion spring 815. The spring loaded retractable reel 105 is configured such that the upper reel component 805 and the lower reel component 810 rotate with respect to the housing (i.e., the assembly of the top housing 110-1 and the bottom housing 110-2). A tether 405 is wound onto components of the spring-loaded retractable reel 105. A clip 115 (not shown) could be disposed on the bottom housing 110-2. The spring loaded retractable reel 105 is configured so that the spiral torsion spring 815 applies a rotational torque to the upper reel component 805 to exert a retraction force $F_r$ on the tether 405.

In embodiments of the invention, the top housing 110-1, bottom housing 110-2, upper reel component 805, and lower reel component 810 could be manufactured, for example, from a thermoplastic or other polymer via well-known plastic injection molding processes. The spiral torsion spring 815 is preferably manufactured from a flat steel (or other metal) strip using a winding process, and the tether 405 is preferably nylon or metal cord.

Alternative materials and/or manufacturing processes could be used for any one or more of the aforementioned components, however. Moreover, the training and control apparatus could use an alternative reel mechanism rather than the spring loaded retractable reel 105 that is illustrated in FIG. 5 and described above.

Operation of the Apparatus

In use, the collar 705 is disposed on the neck of a dog or other animal, and the training and control apparatus is connected to the collar 705. In a pre-deployment state, the tether 405 is fully (or at least substantially) retracted into the spring loaded retractable reel 105, and the pendant 305 is disposed adjacent to the collar. The training and control apparatus is configured so that when an animal wearing the training and control apparatus begins to run, a motion-based acceleration ($a_m$) causes the pendant 305 to be deployed downward, interfering with the animal's front legs and disrupting the running activity. Once the animal stops running, the spring loaded retractable reel 105 and tether 405 cooperate to automatically draw the pendant 305 back towards the collar. Through repeated cycles of deployment, the animal is discouraged from running.

Optional Remote Control Feature

Figure 9:
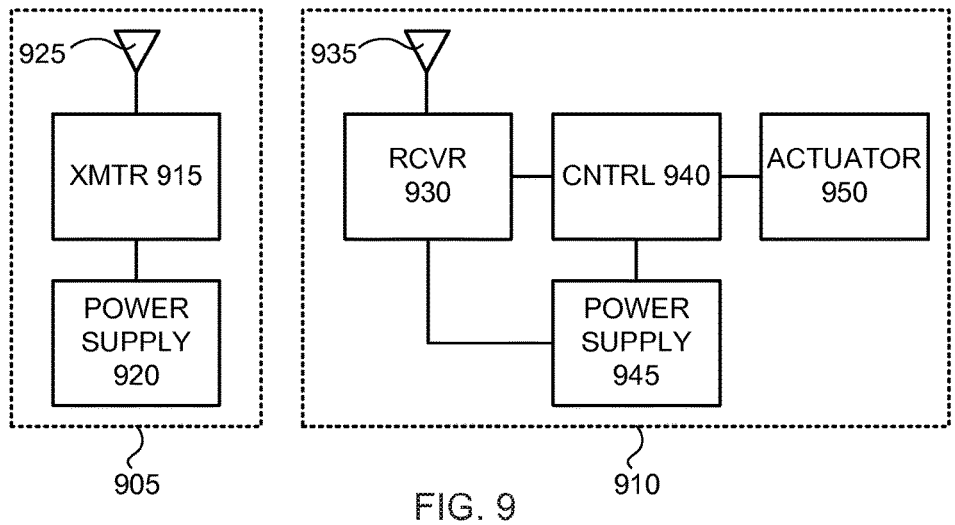
FIG. 9 is a functional block diagram of a remote control system for a training and control apparatus, according to an embodiment of the invention.

FIG. 9 is a functional block diagram of a remote control system for a training and control apparatus, according to an embodiment of the invention. As illustrated in FIG. 9, an operator console 905 is configured to communicate with a collar system 910 via radio frequency (RF) signaling. The operator console 905 includes a transmitter 915 that is connector to a power supply 920 and antenna 925. The transmitter 915 may operate, for example, in the 10 MHz-10 GHz range. The power supply 920 may be or include, for instance, a battery pack.

The collar system 910 includes a receiver 930 that is connected to a power supply 945, antenna 935, and controller 940. The receiver 930 is configured to cooperate with the transmitter 915 and may operate, for example, in the 10 MHz-10 GHz range. The power supply 945 is also coupled to the controller 940 and may be or include, for instance, a battery pack. The controller is connected to an actuator 950.

In operation, the transmitter 915 sends an RF control signal (not shown) to the receiver 930 to enable or disable a training and control apparatus (not shown). The receiver 930 converts the RF control signal to an electrical control signal. The controller 940 converts the electrical control signal to a high-current control signal to operate the electromechanical actuator 950.

Figure 10:
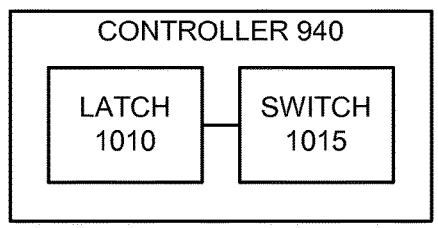
FIG. 10 is a functional block diagram of a controller, according to an embodiment of the invention.

FIG. 10 is a functional block diagram of a controller, according to an embodiment of the invention. In the illustrated embodiment, the controller 940 includes a latch 1010 coupled to a switch 1015. In embodiments of the invention, the electrical control signal is a digital pulse. The latch 1010 latches the digital pulse to retain either an enabled or disabled control state, and the switch 1015 provides a high-current control signal based on the control state for operation of an electro-mechanical actuator 950. The switch 1015 may be or include, for example, a mechanical relay, a solid-state relay, or a switching transistor, according to design choice. The actuator 950 may be or include a solenoid as described below with reference to FIGS. 11 and 12.

Figures 11, 12:
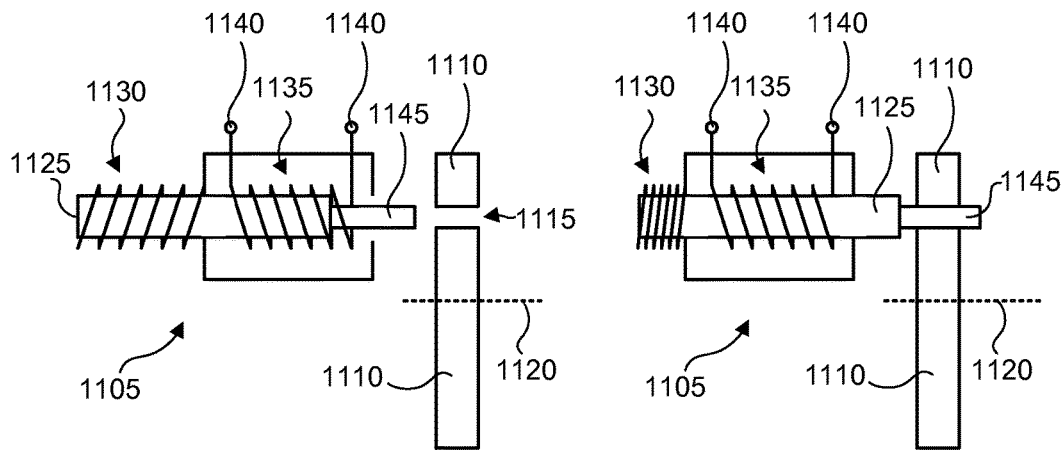
FIG. 11 is a schematic diagram of an actuator when a training and control apparatus is in an enabled state, according to an embodiment of the invention.
FIG. 12 is a schematic diagram of an actuator when a training and control apparatus is in a disabled state, according to an embodiment of the invention.

FIG. 11 is a schematic diagram of an actuator when a training and control apparatus is in an enabled state, according to an embodiment of the invention. FIG. 12 is a schematic diagram of an actuator when a training and control apparatus is in a disabled state, according to an embodiment of the invention.

FIGS. 11 and 12 illustrate a solenoid 1105 and reel component 1110. The solenoid 1105 is an exemplary actuator 950. The reel component 1110 may be or include, for instance, the upper reel component 805 or the lower reel component 810. The solenoid 1105 includes a plunger 1125. A thrust pin 1145 is disposed at one end of the plunger 1125. A return spring 1130 is connected to an opposite end of the plunger 1125 and disposed around a portion of the plunger 1125. A coil 1135 having terminals 1140 is wrapped around another portion of the plunger 1125 within the body of the solenoid 1105. The reel component 1110 includes a hole 1115 that is offset from a rotational axis 1120 of the reel component 1110.

When the training and control apparatus is enabled (and also when the collar system 910 is not powered), the solenoid is positioned as shown in FIG. 11 and the reel component 110 is free to rotate when the training and control apparatus is deployed. In the enabled state, the training and control apparatus can either be in a pre-deployment (pendant retracted) state or in a deployed state. When the training and control apparatus is disabled, a high current control signal at terminals 1140 creates an electromagnetic field (EMF) that causes the plunger 1125 to shift (e.g., centering within the solenoid body), the return spring 1130 to compress, and the thrust pin 1145 to engage the reel component 1110 at the hole 1115, as shown in FIG. 12. Accordingly, the state illustrated in FIG. 12 prevents rotation of the reel component 1110, which prohibits deployment of the pendant and fixes the training and control apparatus in a pre-deployment (pendant retracted) state.

CONCLUSION

Embodiments of the invention provide many potential benefits. For example, full time human control and supervision is not required to discourage a dog or other animal from running. A pendant of the training and control apparatus may provide entertainment value through ornamentation. In addition, the training and control apparatus described herein does not suffer the other shortcomings of leashes and shock collars described above. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Features variously described in this specification could be combined in ways not expressly illustrated or described.

I claim:

1. An animal control apparatus comprising:
   a spring loaded retractable reel;
   the spring loaded retractable reel configured to cooperate with a collar;
   a tether coupled to the spring loaded retractable reel; and
   a pendant coupled to the tether, the animal control apparatus configured such that, in use, the pendant is secured relatively close to the spring loaded retractable reel at rest and the pendant is deployed relatively far from the spring loaded retractable reel when the pendant is subjected to an acceleration caused by movement of the animal that adds to a gravitational pull on the pendant and overwhelms a retraction force of the spring loaded retractable reel in order to inhibit the movement of the collared animal.

2. The animal control apparatus of claim 1, wherein the spring loaded retractable reel includes a clip configured to removably couple the animal control apparatus to a collar.

3. The animal control apparatus of claim 1, further comprising the collar, the spring loaded retractable reel fixably coupled to the collar.

4. The animal control apparatus of claim 1, further comprising the collar, the spring loaded retractable reel being an integral part of the collar.

5. The animal control apparatus of claim 1, wherein the spring loaded retractable reel includes:
   a housing;
   at least one rotating component movably coupled to the housing; and
   a spiral torsion spring coupled to the housing and the at least one rotating component, the spring loaded retractable reel configured to receive the tether, the spiral torsion spring applying a retraction force on the tether in use.

6. The animal control apparatus of claim 5, wherein the housing and the at least one rotating component is made of plastic, and wherein the spiral torsion spring is manufactured from a metal strip.

7. The animal control apparatus of claim 1, wherein the tether includes nylon.

8. The animal control apparatus of claim 1, wherein the pendant includes ornamentation.

9. The animal control apparatus of claim 1, wherein the pendant includes a storage cavity.

10. The animal control apparatus of claim 1, wherein, in use, the animal control apparatus is disposed such that the pendant is in a position inferior to a neck of the animal.

11. The animal control apparatus of claim 1 further comprising means for remotely controlling the animal control apparatus.

12. A method for using the animal control apparatus of claim 1 comprising:
   securing the animal control apparatus to the animal; and
   after the securing, decoupling a user from the animal control apparatus, the user being distinct from the animal.

13. An animal control apparatus comprising:
   a collar;
   a pendant movably coupled to the collar; and
   means for distancing the pendant from the collar in response to an acceleration caused by movement of the animal that acts on the pendant in order to inhibit the movement of the collared animal.

* * * * *